United States Patent
Mudawar

(10) Patent No.: US 12,360,913 B2
(45) Date of Patent: Jul. 15, 2025

(54) VIRTUAL MEMORY SUBSYSTEM AND A ONE-LEVEL PAGE TABLE ADDRESS TRANSLATION METHOD WITH MULTIPLE PAGE SIZES

(71) Applicant: KING FAHD UNIVERSITY OF PETROLEUM AND MINERALS, Dhahran (SA)

(72) Inventor: Muhamed Fawzi Mudawar, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 11 days.

(21) Appl. No.: 18/347,650

(22) Filed: Jul. 6, 2023

(65) Prior Publication Data
US 2025/0013577 A1    Jan. 9, 2025

(51) Int. Cl.
*G06F 12/00*     (2006.01)
*G06F 12/1009*   (2016.01)
*G06F 12/1027*   (2016.01)

(52) U.S. Cl.
CPC ...... *G06F 12/1009* (2013.01); *G06F 12/1027* (2013.01)

(58) Field of Classification Search
CPC .......... G06F 12/1009; G06F 12/1027
See application file for complete search history.

(56) References Cited

U.S. PATENT DOCUMENTS

| | | | | |
|---|---|---|---|---|
| 4,434,459 A | * | 2/1984 | Holland | G06F 9/30181 712/210 |
| 5,956,751 A | * | 9/1999 | Lai | G06F 12/0292 711/172 |
| 2005/0027962 A1 | * | 2/2005 | Zhang | G06F 12/1036 711/212 |
| 2013/0091318 A1 | * | 4/2013 | Bhattacharjee | G06F 12/145 711/6 |
| 2016/0019064 A1 | | 1/2016 | Brooks et al. | |
| 2019/0205261 A1 | | 7/2019 | Cheriton | |
| 2020/0034310 A1 | * | 1/2020 | Drzewiecki | G06F 12/1009 |
| 2020/0320016 A1 | | 10/2020 | Breslow | |
| 2022/0004502 A1 | | 1/2022 | Surti et al. | |

OTHER PUBLICATIONS

"OpenSPARC™ T2 Core Microarchitecture Specification", Sun Microsystems Inc., Part No. 820-2545-11, Revision A, Dec. 2007, pp. 158-240.

* cited by examiner

*Primary Examiner* — Reginald G Bragdon
*Assistant Examiner* — Michael L Westbrook
(74) *Attorney, Agent, or Firm* — Oblon, McClelland, Maier & Neustadt, L.L.P.

(57) ABSTRACT

A virtual memory system for managing a virtual memory page table for a central processing unit and a system of encoding a virtual address (VA) is disclosed. The system includes a memory storing an encoded virtual address, a virtual page number having a settable bitfield that is set according to page size and offset, and a virtual memory. The virtual memory addressing circuitry is configured with a zero detector logic circuit and a virtual page number (VPN) multiplexer. The zero detector logic circuit is configured to read bits of the encoded virtual address and outputs the page size. The virtual page number (VPN) multiplexer is configured to select the virtual page number based on the page size and outputs an index to a page table.

4 Claims, 12 Drawing Sheets

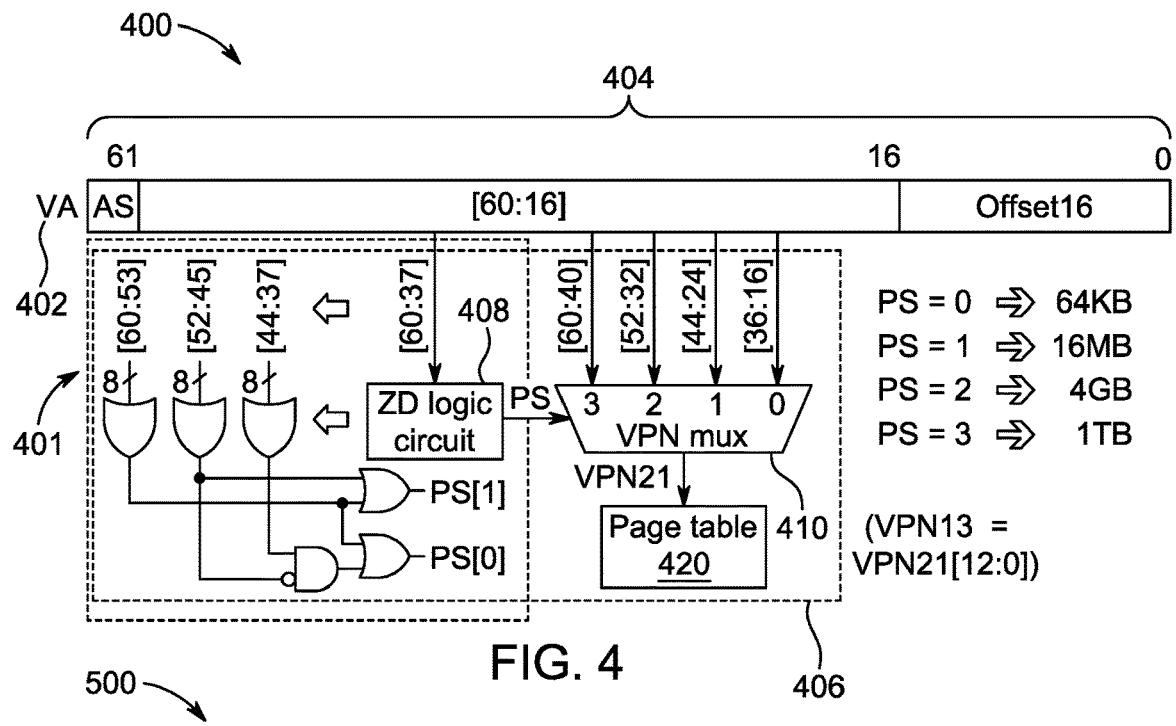
FIG. 4
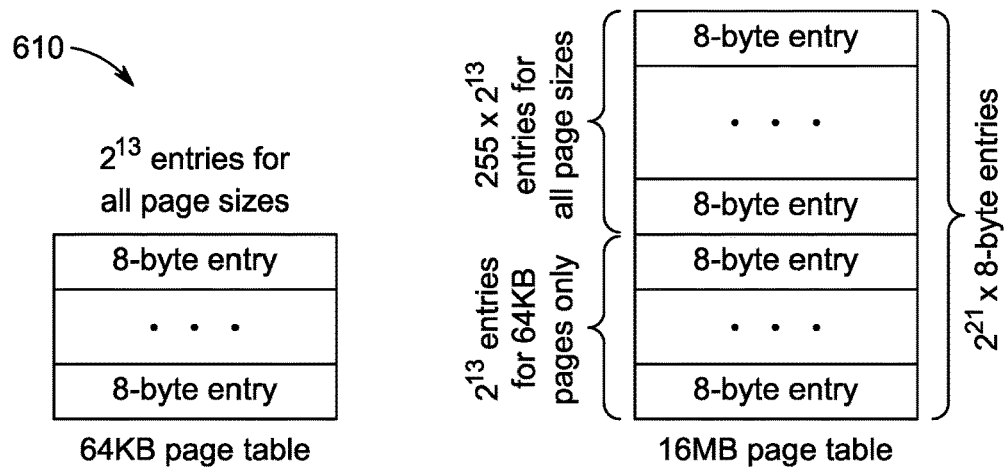
FIG. 5
FIG. 6A
FIG. 6B

| X W V | Meaning |
|---|---|
| 0 0 0 | Page is not part of the address space |
| 0 1 0 | Page resides on disk |
| 1 - 0 | Reserved for dynamic allocation |
| 0 0 1 | Page is read-only |
| 0 1 1 | Page is read-write |
| 1 0 1 | Page is read-execute |
| 1 1 1 | Page is read-write-execute |

VIRTUAL MEMORY SUBSYSTEM AND A ONE-LEVEL PAGE TABLE ADDRESS TRANSLATION METHOD WITH MULTIPLE PAGE SIZES

BACKGROUND

Technical Field

The present disclosure is directed to a method and system for managing virtual memory page tables and translation lookaside buffers to simplify the implementation, improve the performance, and reduce the energy consumption of virtual memory address translation in central processing unit (CPU) cores.

Description of the Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Computing systems use memory virtualization techniques to enable modern central processing unit (CPU) architectures to manage data including retrieval and manipulation of data without having to know where and how the data is stored in a memory. The CPU's allow software processes to access memory using virtual memory addresses. These virtual memory addresses are encoded and mapped to physical memory addresses. The CPU architecture includes hardware and software to translate requests for memory and processing data between virtual and physical memory addresses. Operating systems (OS) may include a memory management unit (MMU) that handles assignment of physical memory to virtual memory, and translates the virtual and physical memory addresses accordingly. The MMU is configured to assign virtual memory through virtual address space (VAS). The VAS or address space is a set of ranges of virtual addresses that an operating system provides to a requested process through the MMU.

Modern central processing unit (CPU) architectures use a hierarchical page table to map the large virtual address (VA) space of a process. For example, the Intel x86-64 and AMD64 architectures use four levels of page tables to map a 48-bit virtual address space. FIG. 1 shows a hierarchical page table that maps a 48-bit virtual address space that is used in conventional systems. As shown, the 48-bit virtual address is split into a 36-bit virtual page number (VPN) and the remaining bits as an offset. The 36-bit VPN is further divided into 9-bit four-level page table indices that include L1, L2, L3 and L4. The offset occupies 12 bits. The 4 KB page size was the preferred choice for Intel x86 and ARM architectures in the 1980s as physical memory was small at that time, and a 32-bit virtual address space was mapped using only two levels of page tables. More recently, RISC-V adopted a 4 KB page size to reduce internal fragmentation and physical memory space. RISC-V refers to an open source instruction set architecture (ISA) based on reduced instruction set computer (RISC) principles.

However, 4 KB pages are becoming a bottleneck for a large virtual address space. The 4 KB page table has only $2^9 \times 8$-byte entries. The 36-bit virtual page number (VPN) is split into four 9-bit fields that are used as indices into a four-level page table.

A 48-bit virtual address requires four levels of page tables, each indexed by a 9-bit field (shown in FIG. 1). At each level, a table entry stores the physical address of the next table in the hierarchy. The lowest-level L1 page table stores the physical page numbers of the mapped 4 KB pages in main memory, as shown in FIG. 1. To increase the virtual address space beyond the 48-bit limit, a five-level, a six-level page table or beyond may be required.

The CPU core uses translation lookaside buffers (TLBs) for fast address translation. Separate instruction and data TLBs, that is, an instruction translation lookaside buffer (ITLB) and a data translation lookaside buffer (DTLB) translate instruction and data addresses, respectively, in parallel. Modern CPU cores also provide a unified "L2 TLB" that captures misses in the ITLB and DTLB. Conventional CPU cores are designed to handle TLB misses in software by invoking an Operating System (OS) kernel. A corresponding exception handler has to "walk" the multi-level page table to find the desired entry and copy its content into the ITLB or DTLB [See: Aamer Jaleel and Bruce Jacob, "In-line Interrupt Handling for Software-Managed TLBs", *International Conference on Computer Design*, 2001, incorporated in its entirety]. The drawback of the exception handler is that it interrupts user-level execution, flushes pipeline, and pollutes caches.

Modern CPU cores use hardware page table walkers (PTWs) to accelerate the handling of TLB misses [See: Abhishek Bhattacharjee and Daniel Lustig, "Architectural and Operating System Support for Virtual Memory", *Synthesis Lectures*, 2017, incorporated in its entirety]. Hardware PTWs overlap the handling of TLB misses with independent instruction execution and can serve multiple TLB misses concurrently.

In addition to hardware PTWs, modern CPU cores use special memory management unit (MMU) caches [See: Abhishek Battacharjee: "Large-reach memory management unit caches", in *International Symposium on Microarchitecture*, 2013, incorporated in its entirety] to store non-leaf entries of multi-level page tables. This added hardware complexity is used for accelerating page table walks when handling TLB misses.

Using only the 4 KB pages is inefficient in a large virtual address space. More entries are needed in the TLBs for small 4 KB pages to increase the TLB reach and reduce TLB misses. For this reason, modern CPU architectures define large page sizes.

For example, the Intel x86-64 and AMD64 architectures define three page-sizes: 4 KB, 2 MB, and 1 GB. The offsets for the 4 KB, 2 MB, and 1 GB page-sizes are 12 bits (referred to as Offset12), 21 bits (referred to as Offset21), and 30 bits (referred to as Offset30), respectively, as shown in FIG. 2 in 48-bit virtual address. The 2 MB page size merges the L1 index with Offset12 to obtain the 21-bit offset. The 2 MB physical page number is stored in an L2 table. The 1 GB page size merges the L2, L1, and Offset12 fields to obtain the 30-bit offset. The 1 GB physical page number is stored in an L3 table, skipping the L2 and L1 tables.

Having the 2 MB and 1 GB page size makes better use of the hierarchical page table and TLB entries. More memory can be mapped using the large page sizes with fewer entries in the TLB, resulting in less TLB misses and improved performance. Modern operating systems also provide support for large page sizes.

However, supporting multiple page sizes in a hierarchical page table complicates the implementation of TLBs. Different page sizes have a different number of offset bits. Since the page size is not encoded in the virtual address, but known only after address translation, separate "L1 TLBs" are needed [See: Guilherme Cox and Abhishek Bhattacharjee, "Efficient address translation for architectures with multiple page sizes", in *International Conference on Architectural Support for Programming Languages and Operating Systems*, 2017, incorporated in its entirety]. For example, the Intel's Skylake processors use three L1 DTLBs for translating data addresses: 1) 64-entry 4-way DTLB for the 4 KB pages, 2) 32-entry 4-way DTLB for the 2 MB pages, and 3) 4-entry fully associative DTLB for the 1 GB pages [See: Intel, "Skylake microarchitecture", www.7-cpu.com/cpu/Skylake_X.html, incorporated in its entirety]. On a data reference, all three L1 DTLBs are looked up in parallel to translate the virtual address in one clock cycle, consuming more processor energy than using one DTLB.

Accordingly, it is one object of the present disclosure to provide a method of encoding virtual memory addresses with any of multiple page sizes and translating them efficiently with a TLB. A further aspect is a one-level page table that is used to map a large virtual address space, for example up to a 61-bit virtual address space.

SUMMARY

The foregoing general description of the illustrative embodiments and the following detailed description thereof are merely exemplary aspects of the teachings of this disclosure, and are not restrictive.

In an embodiment, a virtual memory system for managing a virtual memory page table for a central processing unit is disclosed. The virtual memory system includes a memory configured to store an encoded virtual address, a virtual page number, encoded in the virtual address, having a settable bitfield that is set according to page size and offset; and a virtual memory. The virtual memory addressing circuitry is configured with a Zero Detector logic circuit that reads bits of the encoded virtual address and outputs the page size, and a virtual page number (VPN) multiplexer that selects the virtual page number based on the page size and outputs an index to a page table.

In another embodiment, a method of managing a virtual memory page table for a central processing unit includes encoding a virtual address, setting a bitfield in a virtual page number according to page size and offset, and reading, via a Zero Detector logic circuit, bits of the encoded virtual address and outputting the page size; and selecting, via a virtual page number (VPN) multiplexer, the virtual page number based on the page size and outputting an index to a page table.

In another embodiment, a system of encoding the virtual address (VA) in a VA memory for four different page sizes in a main memory, with a virtual page number encoded in settable bitfields of the VA. The page size PS is implicit in the VA according to the number of leading zeros in the VA.

BRIEF DESCRIPTION OF THE DRAWINGS

FIG. 4 shows a virtual memory system for managing a virtual memory page table for a central processing unit, according to one or more embodiments.

FIG. 5 illustrates an upper 3-bit AS field encoded in the virtual address, according to one or more embodiments.

FIGS. 6A, 6B illustrates 64 KB and 16 MB page tables, according to one or more embodiments.

Figure 1:
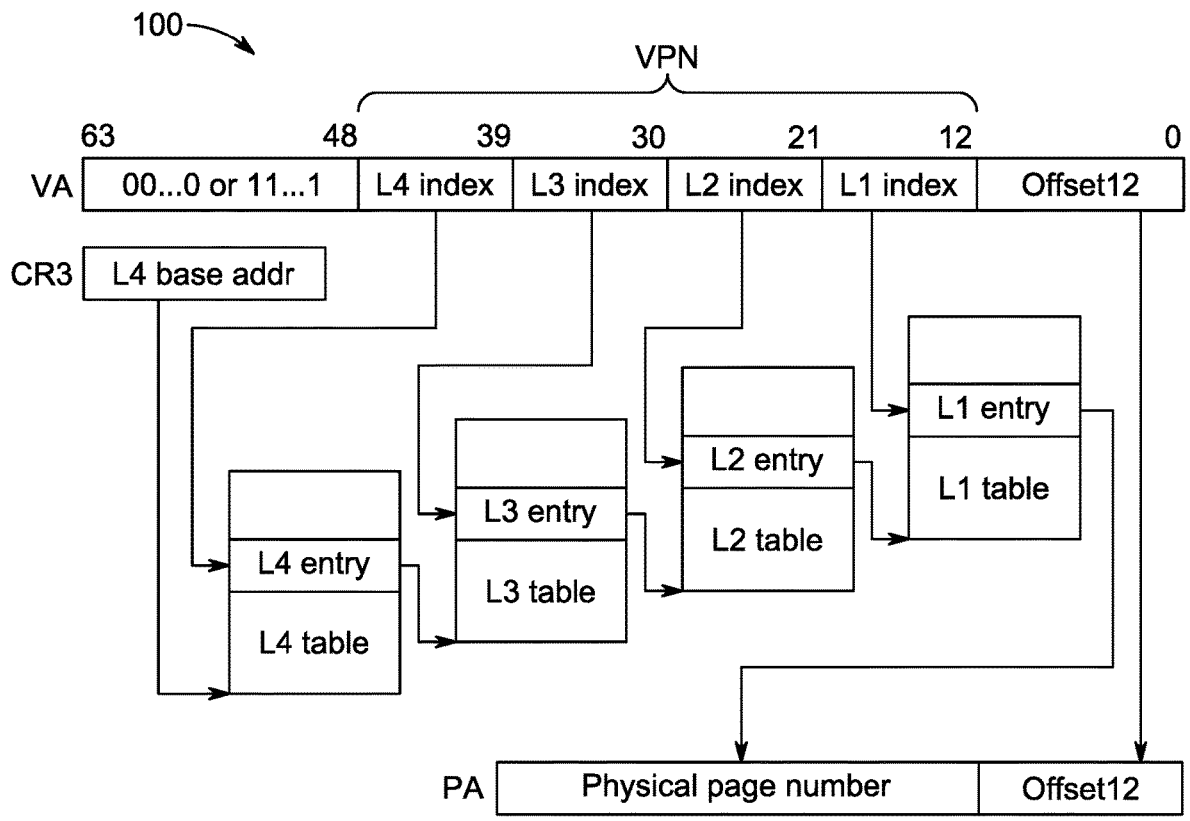
FIG. 1 shows a hierarchical page table that maps a 48-bit virtual address space used in Intel x86-64 and AMD64 architectures that are in use in conventional memory systems.
Figure 2:
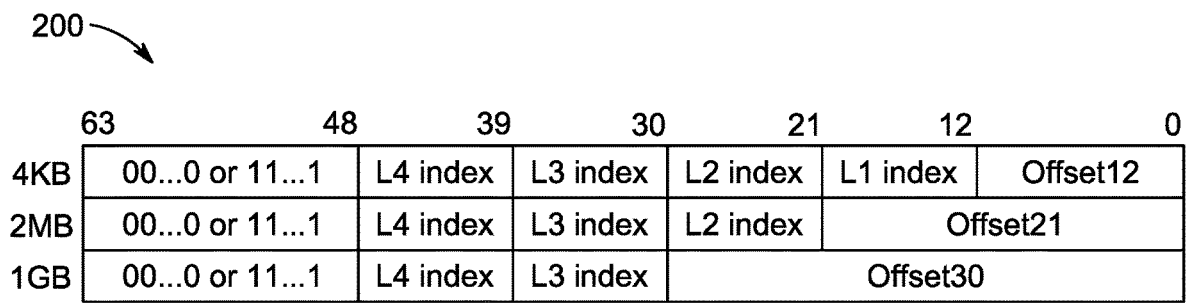
FIG. 2 shows virtual address formats used in the x86-64 and AMD64 architectures.

A more complete appreciation of this disclosure and many of the attendant advantages thereof will be readily obtained as the same becomes better understood by reference to the following detailed description when considered in connection with the accompanying drawings, wherein:

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Figure 3A:
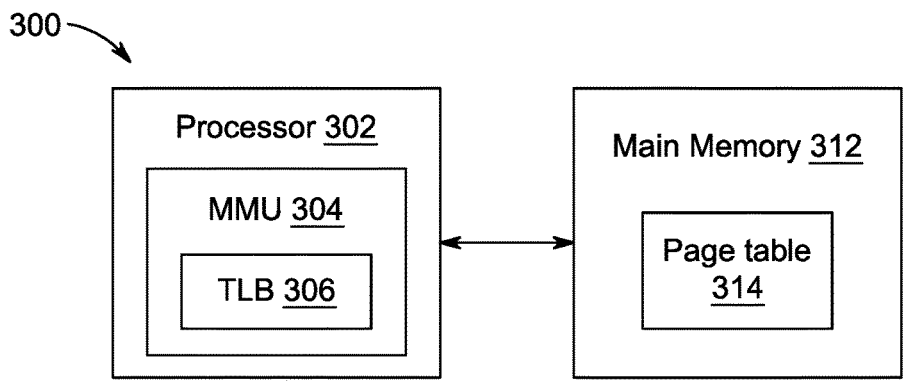
FIG. 3A is a block diagram of a computer system.

Aspects of this disclosure are directed to a system and method of virtual memory management and encoding virtual addresses with multiple page sizes and translating them with the same translation lookaside buffers (TLB). FIG. 3A illustrates a general architecture of a computing system 300 that shows a central processing unit (CPU) 302, also referred to as a processor, and main memory 312. The computing system 300 can be part of any of several types of computers that use virtual memory, including, but not limited to, workstations, desktop computers, laptop computers, embedded computers, and game consoles. The main memory 312 is a volatile memory with which the CPU directly retrieves program instructions and data, and stores data during program execution. The main memory 312 can be implemented using technologies including random access memory (RAM), dynamic RAM (DRAM), and synchronous DRAM (SDRAM), and others. The processor 302 includes a memory management unit (MMU) 304. The MMU 304 connects to the main memory 312 via a memory bus. The MMU 304 includes a translation lookaside buffer (TLB) 306. Although it is shown that the processor 302 includes the MMU 304, in some implementations, the MMU 304 may be a separate unit implemented as an integrated chip (IC) outside the processor 302. The processor 302 may be a general processing device or a special processing device. The MMU 304 may be a computer hardware component that handles all memory and caching operations associated with the processor 302.

In operation, the processor 302 accesses program instructions and data stored in the main memory 312 by issuing memory requests through one or more memory controllers. The processor 302 may reference memory locations using virtual addresses. The MMU 304 processes the memory requests by translating the virtual address to physical memory addresses. In some embodiments, the MMU 304 performs the translations using entries in page table 314. The page table 314 stores a mapping between virtual address and physical address. In examples, the page table 314 encodes the mapping between the virtual address and the physical address. In some examples, the page table 314 stores address translation information in a tree, hash table, or associative map data structure. The MMU 304 upon accessing a virtual address performs a virtual-to-physical address translation by checking the TLB 306 for the translation. In examples, there may be a successful translation or there may not be translations. In cases, where the translation is not available in the TLB 306, then such situations may be referred to as a TLB miss. In response to the TLB miss, the MMU 304 is configured to perform a page table walk. In the case of the TLB miss, only one memory reference is required to address a one-level page table. The virtual address encoding method of the disclosure simplifies the implementation of TLBs. The TLB entries can be used for all page sizes, which eliminates the need to have multiple L1 TLBs for different page sizes. The virtual encoding method also eliminates the lookup of multiple L1 TLBs in parallel, which reduces energy consumption for TLB hits.

The use of a one-level page table for address translation is also the simplest to implement in software and hardware. As a result, there is no need for complex hardware page table walkers (PTWs) for handling TLB misses. Similarly, there is no need for memory management unit (MMU) caches for storing page translations from non-leaf table entries because these do not exist in a one-level page table. The result is a simplified hardware structure and reduced energy consumption for handling TLB misses.

This disclosure defines four page sizes configured to cater to process demand for memory space. The four page sizes include 64 KB, 16 MB, 4 GB, and 1 TB. The page offsets for 64 KB, 16 MB, 4 GB, and 1 TB are 16 bits (Offset16), 24 bits (Offset24), 32 bits (Offset32), and 40 bits (Offset40), respectively. The 1 TB superpage size can be used in huge virtual and physical address spaces.

The choice of the above four page-sizes can cover a 61-bit virtual address space. However, other page sizes can be defined and are contemplated herein. Although, the disclosure describes four page sizes include 64 KB, 16 MB, 4 GB, and 1 TB, the method and system in the disclosure can be applied for other page sizes that are not disclosed here, but are contemplated. In aspects, a smallest page size may be 64 KB. The 64 KB page size has more advantages than the traditional 4 KB page size. More memory can be mapped using the 64 KB page size in the page table 314 and TLB entries. Transferring 64 KB pages to or from secondary storage is more efficient than transferring 4 KB pages. Moreover, a larger L1 cache can be indexed using the 16-bit offset of a 64 KB page versus the 12-bit offset of a 4 KB page. This indexing can be done in parallel while the virtual page number is translated enabling fast cache hit time.

This disclosure uses a small 64 KB or a large 16 MB page as a one-level page table. A 64 KB page table has 213×8-byte entries indexed by a 13-bit virtual page number (VPN13), while a 16 MB table has $2^{21}$×8-byte entries indexed by a 21-bit virtual page number (VPN21). The disclosure enables use of multiple contiguous 64 KB pages as a page table.

This disclosure describes four different formats for the virtual address according to the page size. The 13-bit or 21-bit virtual page number (VPN13 or VPN21) field is shifted left in the virtual address according to the page size and offset, as shown in 300B of FIG. 3B. A 64 KB page table can map a large 53-bit virtual address space using the four page sizes, while a 16 MB page table can map a 61-bit virtual address space.

This disclosure defines an upper 3-bit of the virtual address as address space (AS) field. The AS field defines eight separate address spaces mapped by eight different page tables. The AS field separates the application from OS kernel virtual address space and allows defining of separate page address spaces for libraries that can be shared by all applications.

This disclosure uses sub-paging to reduce the internal fragmentation in large pages. Based on memory demand, the MMU 304 can allocate a subpage of a larger page, which is a contiguous block of smaller pages. Also, the disclosure provides a hardware implementation for fast address translation. The TLB 306 is also used simultaneously by all different page sizes, which is not possible currently and in state-of-the-art CPU implementations. This disclosure provides handling TLB miss by producing only one memory reference into a single-level page table. The complexity of "walking" a hierarchical page table of conventional methods is eliminated.

Figure 3B:
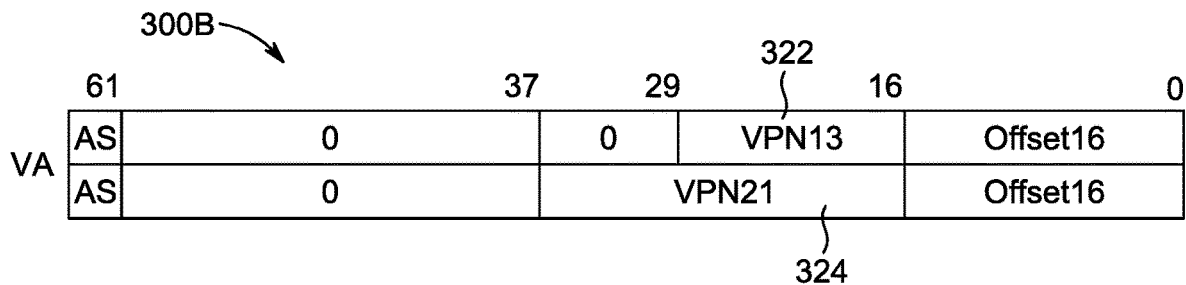
FIGS. 3B, 3C, 3D, 3E show exemplary four virtual address (VA) formats, according to one or more embodiments.
Figure 3C:
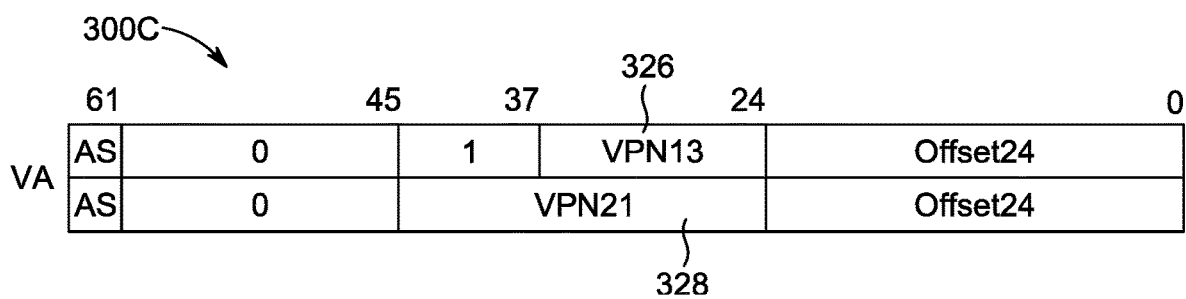
Figure 3D:
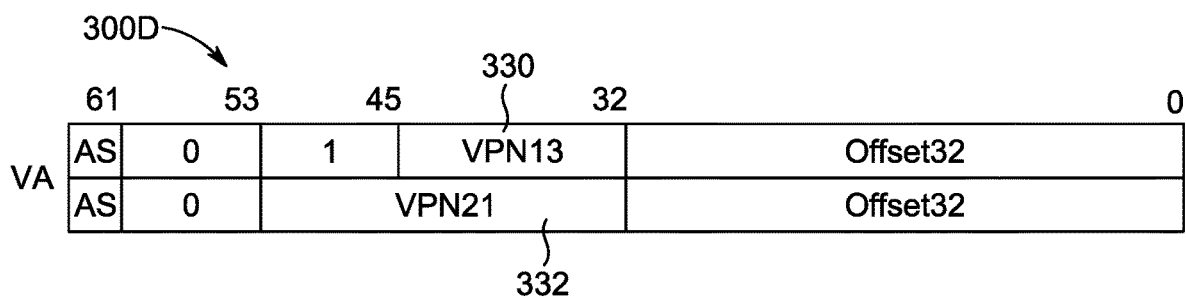
Figure 3E:
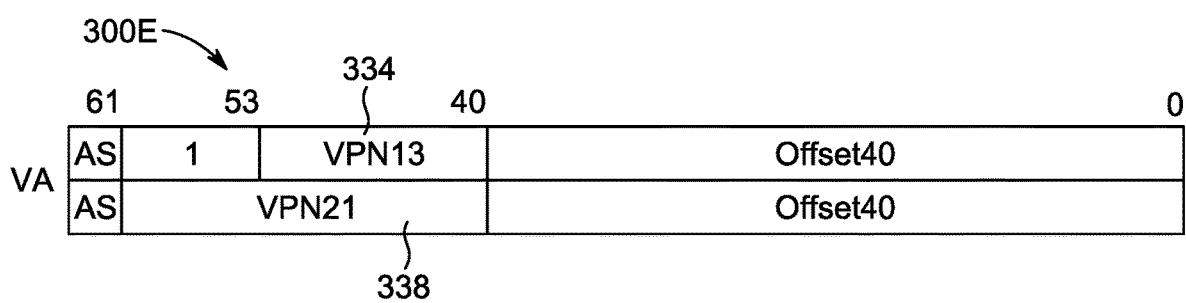

FIG. 3B-FIG. 3E discloses the four virtual address (VA) formats, according to one or more embodiments. The four VA formats are defined using four page sizes including 64 KB, 16 MB, 4 GB, and 1 TB. In one or more embodiments, there is no fixed bitfield for the virtual page number, as in a hierarchical page table. In exemplary implementations, VPN13 and VPN21 may have four different positions in VA according to page size and offset. In aspects, a page size is implicitly encoded in VA. If the page size is greater than 64 KB then the bits that appear to the left of VPN13 is equal to 1, as shown in FIG. 3C to FIG. 3E. Otherwise, hardware associated with virtual memory system may detect the VA as an invalid address. FIG. 3B shows a VA format 300B having a page size of 64 KB. The 64 KB includes an offset that is of 16 bits (Offset16). The virtual page number is 13 bits (VPN13) for a 64 KB page table 322, and 21 bits (VPN21) for a large 16 MB page table 324. The VPNs are shifted left in the virtual address according to the page size and offset. The page size is implicit in VA according to the number of leading zeros appearing before VPN21. FIG. 3C shows a VA format 300C having a page size of 16 MB. The 16 MB includes an offset that is of 24 bits (Offset24). The virtual page number is 13 bits (VPN13) for a 64 KB page table 326, and 21 bits (VPN21) for a large 16 MB page table 328. Since the page size is greater than 64 KB, the bits that appear to the left of VPN13 is equal to 1. FIG. 3D shows a VA format 300D having a page size of 4 GB. The 4 GB includes an offset that is of 32 bits (Offset32). The virtual page number is 13 bits (VPN13) for a 64 KB page table 330, and 21 bits (VPN21) for a large 16 MB page table 332. Since the page size is greater than 64 KB, the bits that appear to the left of VPN13 is equal to 1. FIG. 3E shows a VA format 300E having a page size of 1 TB. The 1 TB includes an offset that is of 40 bits (Offset40). The virtual page number is 13 bits (VPN13) for a 64 KB page table 334, and 21 bits (VPN21) for a large 16 MB page table 336. Since the page size is greater than 64 KB, the bits that appear to the left of VPN13 is equal to 1. In some aspects, to distinguish between the different page sizes, the upper eight bits of VPN21 is set to some value and not 0 if the page size is 16 MB, 4 GB, or 1 TB. In aspects, upper 8 bits of VPN21 may have values between 1 to 255, and is not equal to zero. In case, if the value is zero, the virtual memory system may term the VA as an invalid address. A 3-bit AS shown from 61 bit (in all FIG. 3B-FIG. 3E) field defines address space for all the four page sizes including 64 KB, 16 MB, 4 GB, and 1 TB. In examples, the upper 3-bit AS field of VA defines eight separate address spaces for the user application, shared libraries, the OS kernel, and memory-mapped IO devices.

FIG. 4 shows a virtual memory system 400 for managing a virtual memory page table for the CPU, according to one or more embodiments. The virtual memory system 400 is configured to perform extraction of the page size (PS) from VA 402. The virtual memory system 400 incudes a memory 404, and a virtual memory addressing circuitry 406. The memory 404 encodes the VA 402. The virtual memory addressing circuitry 406 is configured to manage the virtual memory system 400. It is contemplated that the virtual memory addressing circuitry 406 can be implemented as logic circuitry in the MMU or as Firmware in the MMU. The virtual memory addressing circuitry 406 includes a zero detector logic circuit 408 (shown as a circuit in 401) and a virtual page number (VPN) multiplexer 410. The zero detector logic circuit 408 is a circuit configured to detect zeros. In some examples, the zero detector logic circuit 408 may be implemented using one or more logic gates 401. As shown in an exemplary implementation of FIG. 4, the zero detector logic circuit 408 is implemented in circuit 401 using a three 8-input reduction OR gates to detect zeros at various bits of VA, and two OR and an AND gate to output the PS bits. According to an embodiment, the zero detector logic circuit 408 is configured to read bits of the encoded VA 402. The zero detector logic circuit 408 examines the VA 402 to identify number of leading zeros. In an aspect, the zero detector logic circuit 408 detects a number of leading zeros appearing before a virtual page numbers (for example, VPN13) in the examined encoded VA 402. The VPN includes a settable bitfield that is set according to page size and offset. In some aspects, the zero detector logic circuit 408 examines bits [60:37] (bits between 60 and 37) of the VA 402 to determine the PS. In circuit 401, the three 8-input reduction OR gates detect zeros in bits [60:53] (bits between 60 and 53), [52:45] (bits between 52 and 45), and [44:37] (bits between 44 and 37) of the VA 402, as shown in FIG. 4. Two OR and an AND gate output the bits PS[1] and PS[0]. PS[1]=(VA[60:45]!=0), indicating that the page size is either 4 GB or 1 TB. PS[0]=(VA[60:53]!=0)|(VA[52:45]==0 & VA[44:37]!=0), indicating that the page size is either 1 TB or 16 MB. If PS[1] and PS[0] are both 0 then the page size is 64 KB. Based on the detected leading zeros and the bits, the zero detector logic circuit 408 outputs the PS. In examples, the PS is 0 for a 64 KB page, 1 for a 16 MB page, 2 for a 4 GB page, or 3 for a 1 TB page. Table 1 shows the implementation of PS detection using the zero detector logic circuit 408.

TABLE 1

PS detection

| | |
|---|---|
| PS = (VA[60:45]==0)? | // Detect Page Size PS |
| (VA[44:37]==0? 0:1): | // Page Size = 64KB or 16MB |
| (VA[60:53]==0? 2:3) | // Page Size = 4GB or 1TB |

The VPN multiplexer 410 selects the VPN and outputs an index to a page table 420. In exemplary implementations, the VPN multiplexer 410 selects the VPN from four different positions in VA 402 and outputs VPN21, which is used as an index into a large 16 MB page table. However, if the size of the page table is 64 KB, which is sufficient for most address spaces, then VPN13 is used as an index, where VPN13=VPN21[12:0] and occupies the lower 13-bit of VPN21. Although, FIG. 4 shows one exemplary implementation of the zero detector logic circuit 408 and the VPN multiplexer 410 using logic gates, other ways of implementing the zero detector logic circuit 408 and the VPN multiplexer 410 not disclosed here are contemplated herein. In embodiments, the virtual memory system 400 may be implemented as a part of a processor. In some embodiments, the virtual memory system 400 may be implemented separately from the processor as an IC, logic circuitry and the like.

FIG. 5 illustrates an upper 3-bit AS field 500 encoded in VA, according to one or more embodiments. The AS field (bits 61-63 as shown in FIG. 3B-FIG. 3C) defines eight separate address spaces for the application, shared libraries, OS kernel, and memory-mapped IO devices. The address spaces (ASs) are allocated by the CPU program for different purposes. The AS field separates the application address space from the OS kernel and enables the definition of address spaces that can be shared by applications. The address spaces are mapped by different page tables. Each address space is mapped by a one-level page table. The AS field also encodes privilege level of the address space (for example, User vs. Supervisor). As a result, the AS field enables the virtual memory system 400 to detect higher privileged access without a need to examine page table entries. Some address spaces are also reserved for future development. Having the encoded privilege level eliminates the need for a global (G) bit or a user/supervisor (U/S) bit in page table entries. As shown, if the AS has a value of '0', the AS indicates information of application address space with user privilege of 0. If the AS has a value between 1-3, the AS indicates information of shared libraries information with user privilege of 0. If the AS has a value of '4', the AS indicates information of OS kernel with supervisor privilege of 1. If the AS has a value of '5', the AS indicates information of memory-mapped IO devices with supervisor privilege of 1. If the AS has a value of 6 or 7, the AS indicates reserved information with the privilege being reserved. In some examples, it may be possible to define separate address spaces for a hypervisor and secure machine software, with higher privilege levels: Hypervisor=2 and Machine=3. In some examples, some address spaces may also be reserved for future development.

Page table and virtual address space are disclosed in FIG. 6A-FIG. 6B. In exemplary embodiments, the disclosure provides two page table sizes. FIG. 6A and FIG. 6B shows 64 KB and 16 MB page tables, respectively. FIG. 6A shows that the 64 KB page table 610 has $2^{13} \times 8$-byte entries. The VA for a small 64 KB page table uses a 13-bit virtual page number (VPN13) to index a 64 KB page table that maps a 53-bit virtual address space. Each entry in the 64 KB page table may map a page of any size. FIG. 6B shows that a large 16 MB page table 620 can have $2^{21} \times 8$-byte entries that can map a 61-bit virtual address space. Virtual addresses for the 64 KB pages (as shown in FIG. 3A) may index any page table entry. A VA uses a 21-bit virtual page number (VPN21) to index a 16 MB page table that maps a 61-bit virtual address space. The VAs for the 16 MB, 4 GB, or 1 TB pages may index the upper 255×213 entries in the 16 MB page table, as the upper 8 bits of VPN21 cannot be 0 and should be 1 to 255. Therefore, the lower 213 entries of the 16 MB page table may map 64 KB pages. However, the upper 255×213 entries can map pages of any size. In some aspects, different virtual addresses may be configured to index the same page table entry if they carry the same virtual page number. To avoid any conflict or misuse, the allocated page size may be stored in each page table entry. The page size encoded in the virtual address can be compared against the page size stored in the page table entry. If there is a mismatch as a result of comparison, then the virtual memory system 400 may generate an exception indicating "Invalid Page Access". In some aspects, the virtual memory system 400 may be configured to have a page table as subpage of a 16 MB page. In such aspects, the virtual memory system 400 may have a page table as a contiguous block of N×64 KB physical pages (2≤N≤255) with N×$2^{13}$×8-byte entries. As a result, the virtual memory system 400 may provide options to choose a best size for a page table. The virtual memory system 400 may be configured to allocate the remaining (256-N)×64 KB physical pages separately.

Figure 7A:
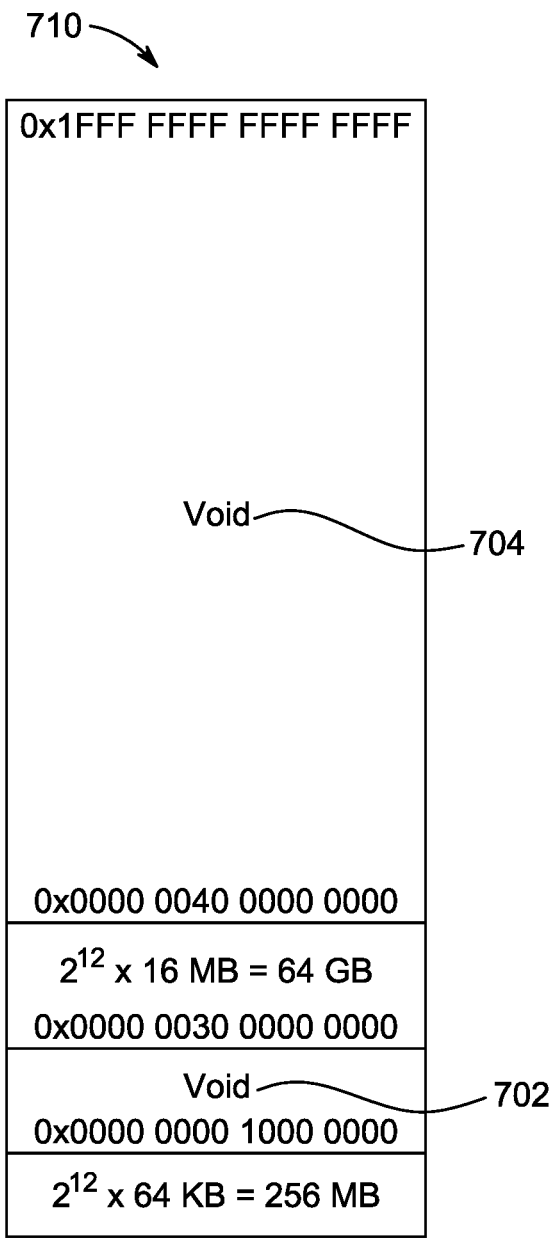
FIGS. 7A, 7B, 7C illustrates regions of growing sizes mapped by the 64 KB page table, according to one or more embodiments.
Figure 7B:
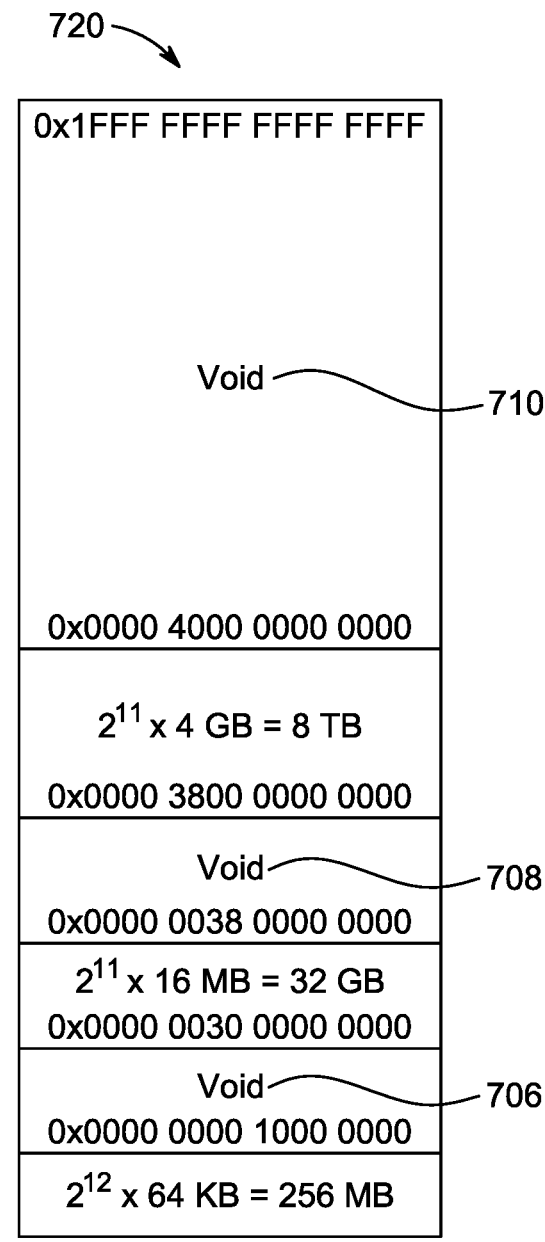
Figure 7C:
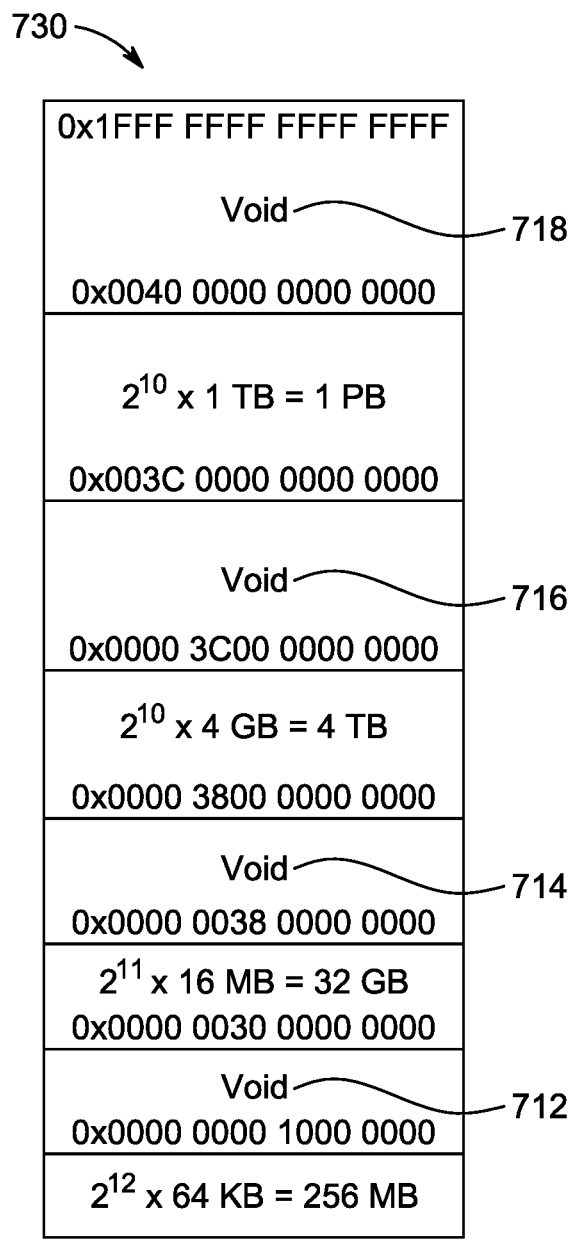

In some aspects, some of virtual address space may remain open for mapping as they are unmapped. In aspects, a page table entry may not be used simultaneously by two different page sizes. Also, the virtual memory system 400 may specify the page size of each page table entry. As a result of above, there may be some voids created in the address space, as shown in FIG. 7A-FIG. 7C. In implementations, the virtual memory system 400 specifies the page size for each page table entry. For example, if the virtual memory system 400 uses a 64 KB page table, then 213 entries may be used. The virtual memory system 400 may standardize the assignment of page table entries. In examples, if the 64 KB and 16 MB page sizes are used, the virtual memory system 400 may allocate 212 entries in the page table for each page size. As a result, there may be two voids 702-704 created in the VA space, as shown as an example in FIG. 7A. On the other hand, if three or four page sizes are used, the virtual memory system may map more according to use of page table entries. However, multiple void regions are created as shown in FIG. 7B and FIG. 7C. To elaborate, if three page sizes are required, then the virtual memory system 400 may split the last 212 entries equally among the 16 MB and 4 GB pages to create three voids 706-710, as shown in FIG. 7B. If all four page sizes are used, the virtual memory system 400 may split the last 211 entries equally among the 4 GB and 1 TB pages to create four voids 712-718, as shown in FIG. 7C. Based on the memory demand, the virtual memory system 400 may use an adaptive algorithm to adjust the allocation of page table entries and the mapping of the virtual address space. Format of physical address is now disclosed in FIG. 8A-FIG. 8D.

Figure 8A:
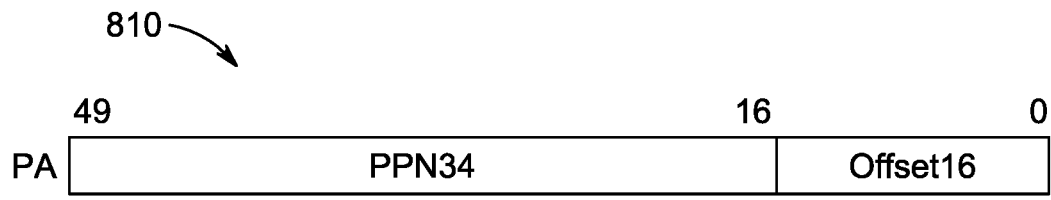
FIGS. 8A to 8D show a format of physical address for four page sizes, according to one or more embodiments.
Figure 8B:
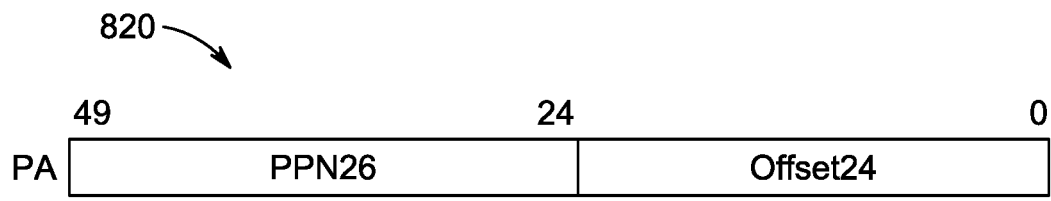
Figure 8C:
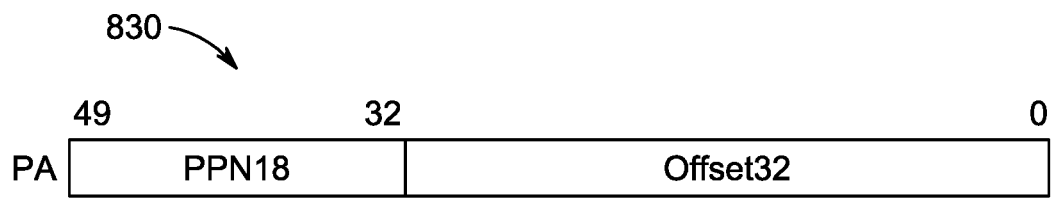
Figure 8D:

FIG. 8A-FIG. 8D shows the format of the physical address for the four page sizes. The size of the physical address space may be made implementation specific. In an example, the physical address may be 50 bits on high-end CPUs. With 50 bits, the processor can address $2^{50}$=1 PB (petabyte) of physical memory. If the physical address PA is 50 bits, then the physical page number is 34 bits (PPN34) 810 for the 64 KB pages as shown in FIG. 8A, 26 bits (PPN26) 820 for the 16 MB pages as show in FIG. 8B, 18 bits (PPN18) 830 for the 4 GB pages as show in FIG. 8C, and 10 bits (PPN10) 840 for the 1 TB pages as show in FIG. 8D. Using a 50-bit PA, a high-end CPU can address $2^{50}$=1 PB of physical memory.

Figure 9A:
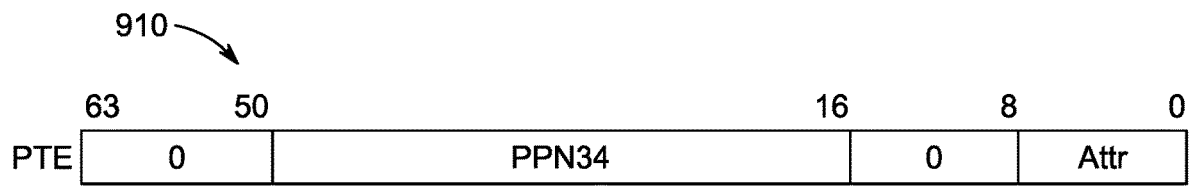
FIGS. 9A to 9D shows a format of 64-bit page table entry (PTE) for the four page sizes, according to one or more embodiments.
Figure 9B:
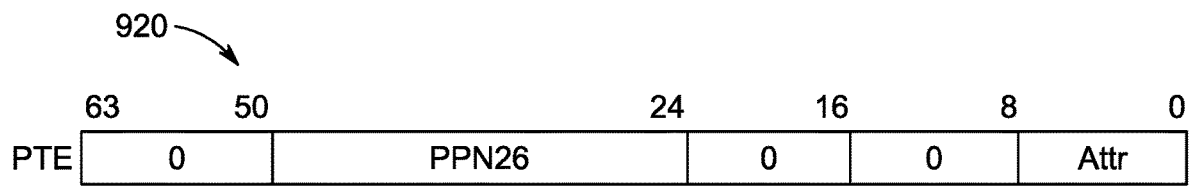
Figure 9C:
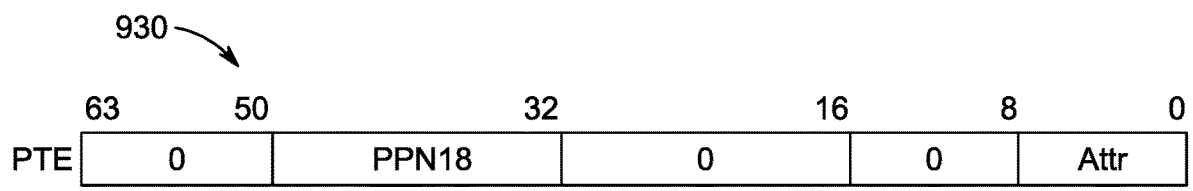
Figure 9D:
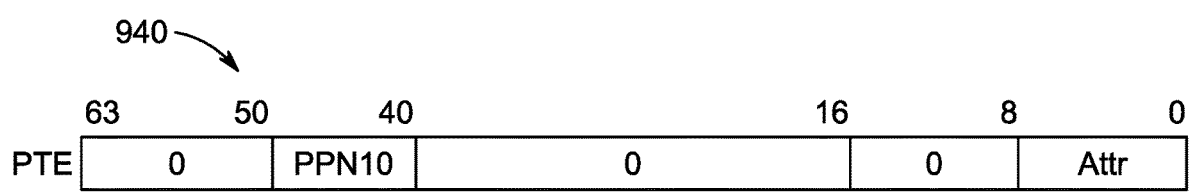

FIG. 9A-FIG. 9D shows format of a 64-bit page table entry (PTE) for the four page sizes. Lower 8-bit of the PTE are for page attributes (bits 0-7) and the upper 48-bit are reserved for the physical page number. FIG. 9A shows page table entry 910 for the 64 KB pages. FIG. 9B shows page table entry 920 for the 16 MB pages. FIG. 9C shows page table entry 930 for the 4 GB pages. FIG. 9D shows page table entry 940 for the 1 TB pages. Page attributes are explained in more detail in FIG. 10.

Figures 10, 11:
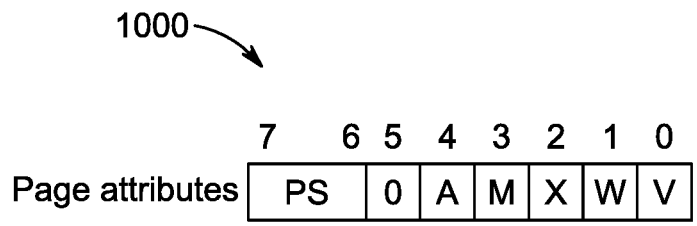
FIG. 10 shows page attributes that occupy lower eight bits of page table entry, according to one or more embodiments.
FIG. 11 shows memory permissions according to X, W, and V bits, according to one or more embodiments.

FIG. 10 shows page attributes 1000 that occupy the lower eight bits of the page table entry. The right most bit, that is bit 0, marked as 'V' indicates if the page table entry is valid. 'W' bit, left to the V bit (bit 1) indicates if the page can be written or not. 'X' bit (bit 2) indicates if the page contains executable code. 'M' bit (bit 3) indicates if a page was modified. 'A' bit (bit 4) indicates if a page was accessed recently. Bit next to the 'A' bit that is bit 5 is kept zero. The 2-bit PS field defines the page size, which can be 64 KB (PS=0), 16 MB (PS=1), 4 GB (PS=2), or 1 TB (PS=3). Since different virtual addresses can carry the same VPN and index the same page table entry, a TLB is configured to check that the page size encoded in the virtual address (VA) matches the page size (PS) stored in the indexed page table entry. If the TLB finds a mismatch, the TLB raises an invalid memory access exception to a non-existing page. In examples, there may be no need for a user/supervisor bit at the page level because the AS field in the virtual address (VA) encodes this information. In addition, there may be no requirement need for a global bit at the page level because the AS field defines separate page tables for shared libraries, the OS kernel, and memory-mapped IO devices that are shared by running processes. Different memory permissions are defined according to the X, W, and V bits. If the page is not valid (V=0) then it can be either not part of the address space, reside on disk, or reserved for dynamic allocation, as shown in FIG. 11.

FIG. 11 shows memory permissions 1100 according to the X, W, and V bits. If the page is not valid (V=0) then it can be either not part of the address space, resides on disk, or reserved for dynamic allocation. Addressing an invalid page, which is not part of the address space (XWV=000) results in a segmentation fault. Addressing an invalid page that resides on disk results in a page fault, which is handled by transferring the page and mapping it in memory. Addressing an invalid page, which is reserved for dynamic allocation (on the stack or heap) is handled by allocating and mapping a new physical page. If the page is valid (V=1) then it can be read-only, read-write, read-execute, or read-write-execute, according to the X and W bits. As shown in FIG. 11, if XWV is 000, then the page is not part of the address space. If XWV is 010, then the page resides on the disk. If XWV is 1-0, then the page is reserved for dynamic allocation. If XWV is 001, then the page is configured for read only. If XWV is 011, then the page is configured for read-write. If XWV is 101, then the page is read-execute. If XWV is 111, then the page is configured for read-write-execute.

In aspects, if a page is not fully used, then internal fragmentation may result from the unused part of the page. For example, for a 64 KB page, the internal fragmentation, which is about half a page or 32 KB on average, is acceptable in modern systems. For a larger 16 MB, 4 GB, or 1 TB page, the internal fragmentation can be substantial and should not be ignored.

Figure 12:
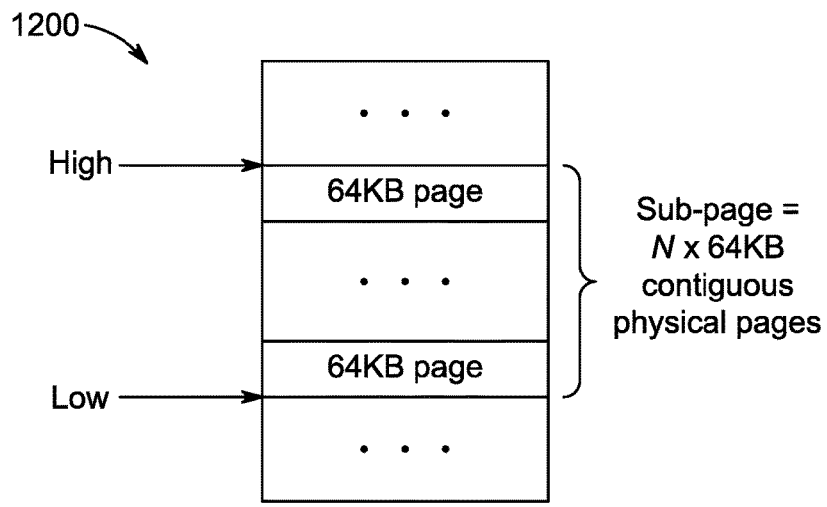
FIG. 12 shows an allocation of a subpage to reduce internal fragmentation, according to one or more embodiments.
Figure 13A:
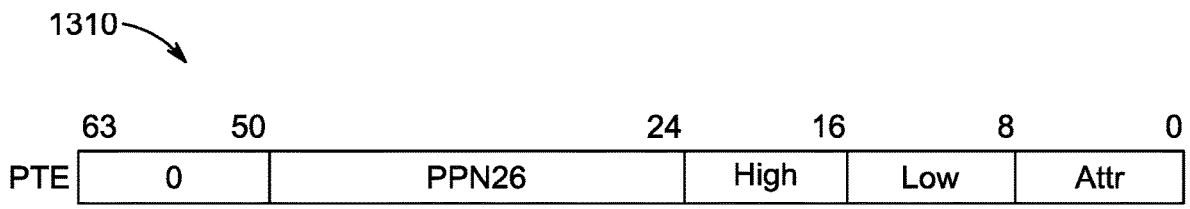
FIGS. 13A, 13B, 13C show revised page table entries with sub-paging, according to one or more embodiments.
Figure 13B:
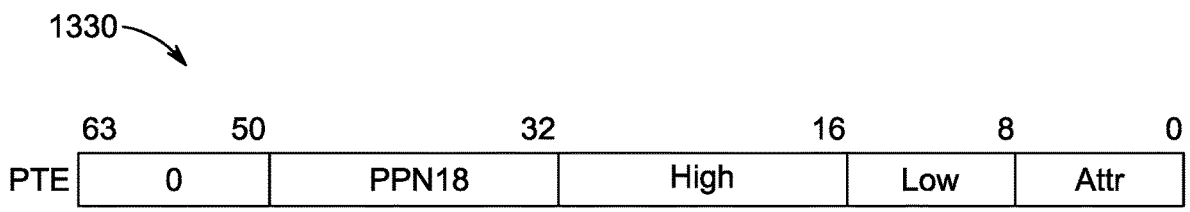
Figure 13C:

FIG. 12 shows allocation of a subpage 1200 to reduce internal fragmentation. In aspects, a 16 MB, 4 GB, and 1 TB physical page may be split into 256 contiguous 64 KB, 16 MB, and 4 GB pages, respectively. However, the 64 KB page cannot be split into smaller pages. As shown, the virtual memory system 400 divides a 16 MB page into 256×64 KB pages. Based on the memory demand, the virtual memory system 400 can allocate a contiguous block of smaller physical pages, rather than a large physical page. For example, the virtual memory system 400 can allocate a subpage having N×64 KB contiguous physical pages (N=1 to 255), rather than a large 16 MB page. The remaining (256-N)×64 KB physical pages are allocated separately. In aspects, a subpage can reside within the physical boundary of a 16 MB page. The Low index points at the first 64 KB page, and the High index points after the last 64 KB page. If High is 0, then it becomes 256 and the subpage terminates at the end of the 16 MB physical page. The Low and High indices point at the first 64 KB page inside and outside the subpage. The number of contiguous 64 KB physical pages is N=High-Low. The remaining 64 KB physical pages can be allocated separately. Sub-paging applies to the 16 MB, 4 GB, and 1 TB physical pages. The page table entries for these three page-sizes are revised to include the Low and High index parameters of the subpage, as shown in FIG. 13A to FIG. 13C. FIG. 13A-FIG. 13C shows revised page table entries with sub-paging. A subpage may start at a Low index and terminates at a High index. The Low index of a 16 MB, 4 GB, and 1 TB subpage starts at a 64 KB, 16 MB, and 4 GB physical page, respectively. The High index points at the first 64 KB page outside the subpage, regardless of the page size. If High is 0, then the subpage terminates at the end of the 16 MB, 4 GB, or 1 TB physical page and cannot cross its boundary. A subpage of a 16 MB page (PS=1) consists of N=High-Low contiguous 64 KB pages. A subpage of a 4 GB page (PS=2) consists of N=High−(Low<<8) contiguous 64 KB physical pages. A subpage of a 1 TB page (PS=3) consists of N=High−(Low<<16) contiguous 64 KB physical pages. The remaining physical pages can be allocated separately. FIG. 13A shows page table entry 1310 for a 16 MB subpage with a low and high 64 KB page index. FIG. 13B shows page table entry 1330 for a 4 GB subpage with a low 16 MB page index. FIG. 13C shows page table entry 1350 for a 1 TB subpage with a low 4 GB page index. In some examples, the virtual memory system 400 may be configured to perform the following:

a. If (PS==1) and (Low==0) and (High==0) then the page size is 16 MB. Otherwise, a subpage consisting of N=High-Low contiguous 64 KB physical pages is mapped. For address translation, the virtual memory system 400 is configured to check whether the upper 8 bits of Offset24 in VA are within range: (VA[23:16]≥Low) and (High==0 or VA[23:16]<High). Otherwise, the virtual address becomes invalid.

b. If (PS==2) and (Low==0) and (High==0) then the page size is 4 GB. Otherwise, a subpage of a 4 GB page is mapped. The Low index points at the first 16 MB physical page, and the High index points at the first 64 KB page outside the subpage. If the High index is 0, then it becomes 216 and the subpage terminates at the end of the 4 GB physical page. The number of contiguous 64 KB physical pages is N=High−(Low<<8). For address translation, the virtual memory system 400 is configured to check that the upper 8-bit and 16-bit of Offset32 in VA are within range: (VA[31:24]≥Low) and (High==0 or VA[31:16]<High). Otherwise, the virtual address becomes invalid.

c. If (PS==3) and (Low==0) and (High==0) then the page size is 1 TB. Otherwise, a subpage of a 1 TB page is mapped. The Low index points at the first 4 GB physical page, and the High index points at the first 64 KB page outside the subpage. If High is 0, then it becomes 224 and the subpage terminates at the end of the 1 TB physical page. The number of contiguous 64 KB physical pages is N=High−(Low<<16). For address translation, the virtual memory system 400 is configured to check that the upper 8-bit and 24-bit of Offset40 in VA are within range: (VA[39:32]≥Low) and (High==0 or VA[39:16]<High). Otherwise, the virtual address may be considered as invalid.

Thus, the unallocated physical pages in a subpage are not wasted and can be allocated separately. These pages can be allocated in the same or different address space.

Figure 14:
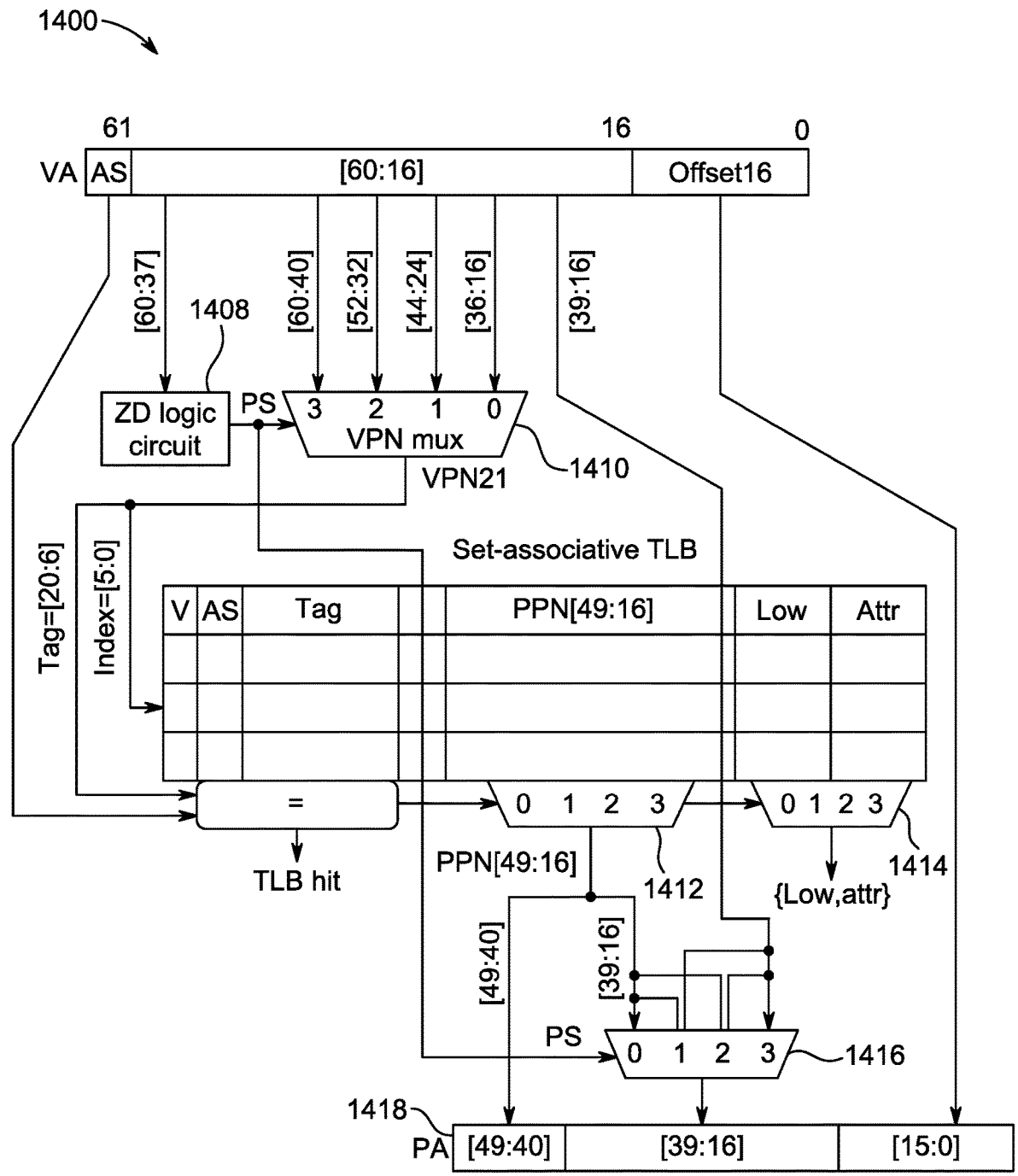
FIG. 14 shows a translation lookaside buffer (TLB) that uses multiple address spaces (AS field) and four different page sizes for fast address translation, according to one or more embodiments.

CPUs provide multiple translation lookaside buffers (TLBs) for fast address translation. For example, Intel's recent processors provide multiple ITLBs and multiple DTLBs for different page sizes. This is because the page size is not known in advance in the virtual address, except after address translation. Multiple L1 TLBs may be indexed in parallel using different index bits in the virtual address. Entries should be examined in parallel from the different TLBs, which increases the energy consumption for address translation. The disclosure uses similar L1 TLB simultaneously by four different page sizes and different address spaces. FIG. 14 shows a TLB 1400 that uses multiple address spaces (AS field) and four different page sizes for fast address translation. In an example, the TLB 1400 is a set-associative TLB that performs fast address translation. According to some embodiments, the zero detector logic circuit 1408 outputs the page size (PS) as described in FIG. 4. Bits VA[60:16] encode VPN21 at four different positions. The VPN multiplexer outputs VPN21 according to PS.

VPN21 = VA[36+PS*8:16+PS*8] // Select Virtual Page Number

The TLB 1400 may be used simultaneously by different page tables and multiple page sizes. A single L1 TLB 1400 can be used for all page sizes. For example, a 4-way set-associative TLB with 64 sets may have 256 entries, as shown in FIG. 14. The smallest page size is 64 KB, which is 16× larger than the 4 KB page, still being used in in many conventional processor architectures. The TLB 1400 reach may become much larger if larger pages or subpages are used. As a result of the aspects of disclosure, there is no need for an L2 TLB, which reduces the complexity and cost of the address translation hardware. According to an example, the zero detector logic circuit 1408 extracts the page size PS according to the number of leading zeros in VA[60:37]. The VPN multiplexer 1410 selects the virtual page number from four different bitfields and outputs VPN21 according to PS. The TLB 1400 extracts TLB index and tag from VPN21. For example, if the TLB has 64 sets then bits [5:0] are used as a set index and bits [20:6] are used as a tag. If there is a TLB hit, the physical address (PA) is obtained and bits [39:16] are selected either from the PPN bits in the TLB 1400 or the upper offset bits in VA, according to the PS.

In examples, if the TLB 1400 has 64 sets, then the lower 6-bit of the virtual page number, VPN21[5:0], is used as an index and the upper 15-bit VPN21[20:6] is used as a tag. This works for all page sizes, regardless of the position of VPN21 in the VA. The upper 3-bit AS field in the VA defines eight separate address spaces. The AS field is also stored in each TLB entry. This allows the sharing of TLB entries by eight different address spaces. On a context switch, only the application TLB entries having AS=0 are invalidated. However, the other TLB entries having AS≠0 are not invalidated because they are shared by other applications. The AS field also encodes the privilege level (User or Supervisor). The privilege level applies to the address space. There is no User/Supervisor bit inside the TLB (or page table) entries.

The TLB 1400 compares the AS and VPN21[20:0] of the VA against the AS and Tag stored in the TLB entries at a given set index. If the TLB 1400 is 4-way set-associative, then four comparators are used for parallel comparison. Small comparators are used because the AS and Tag are small fields (2+15=17 bits only). In contrast, the virtual page number and the tag used in hierarchical page table are long fields that require large comparators. Four-way multiplexers 1412-1416 output the physical page number PPN[49:16] 1418, low index and page attributes.

The TLB 1400 may match the page size PS of the VA against the TLB stored page size (Attr.PS output). If there is a mismatch, the TLB 1400 may raise an "Invalid Address" exception.

```
if (PS != Attr.PS)     // Check Page Size
  Exception "Invalid Address" // Non-existing Page
```

If the page size is larger than 64 KB and sub-paging is used, then the TLB 1400 is configured to check that the Offset of the virtual address VA is within range.

```
if (PS!=0) {  // Page size > 64KB
  High = PPN[15+PS*8:16]   // High index in PPN
  if (VA[15+PS*8:8+PS*8] < Low ||   // VA Offset < Low
    (High!=0 && VA[15+PS*8:16] >= High))  // VA Offset >= High
    Exception "Invalid Address"   // Out-of-Range access
}
```

The TLB 1400 is configured to check the memory permission attributes (X and W bits) of the selected TLB entry, and whether the address space (AS field) is privileged and can be addressed according to the current execution level.

If there is no exception, the VA is translated into a physical address PA. Bits PA[15:0] are the lower 16-bit of the page offset, obtained directly from VA. Bits PA[49:40] are the upper 10-bit of the physical page number PPN[49:40], stored in the selected TLB entry.

The middle 24-bit PA[39:16] is selected according to the page size PS. For a small 64 KB page, PA[39:16] is the lower 24-bit of the mapped physical page number PPN[39:16]. For a 1 TB page, PA[39:16] is the upper 24-bit of the offset, obtained from VA[39:16]. For the 16 MB and 4 GB pages, PA[39:16] is the concatenation of {PPN[39:24], VA[23:16]} or {PPN[39:32], VA[31:16]}, respectively. The TLB 1400 also applies to the 16 MB, 4 GB, and 1 TB subpages.

The process of walking a hierarchical page table, whether in software or hardware, is expensive. For example, to walk a four-level page table, shown in FIG. 1, requires four memory references, all of which must occur sequentially. This disclosure uses a one-level page table for all page sizes, which is not complex to implement. A TLB miss requires only one memory reference to a page table entry, which can be handled easily in software or hardware.

Figure 15:
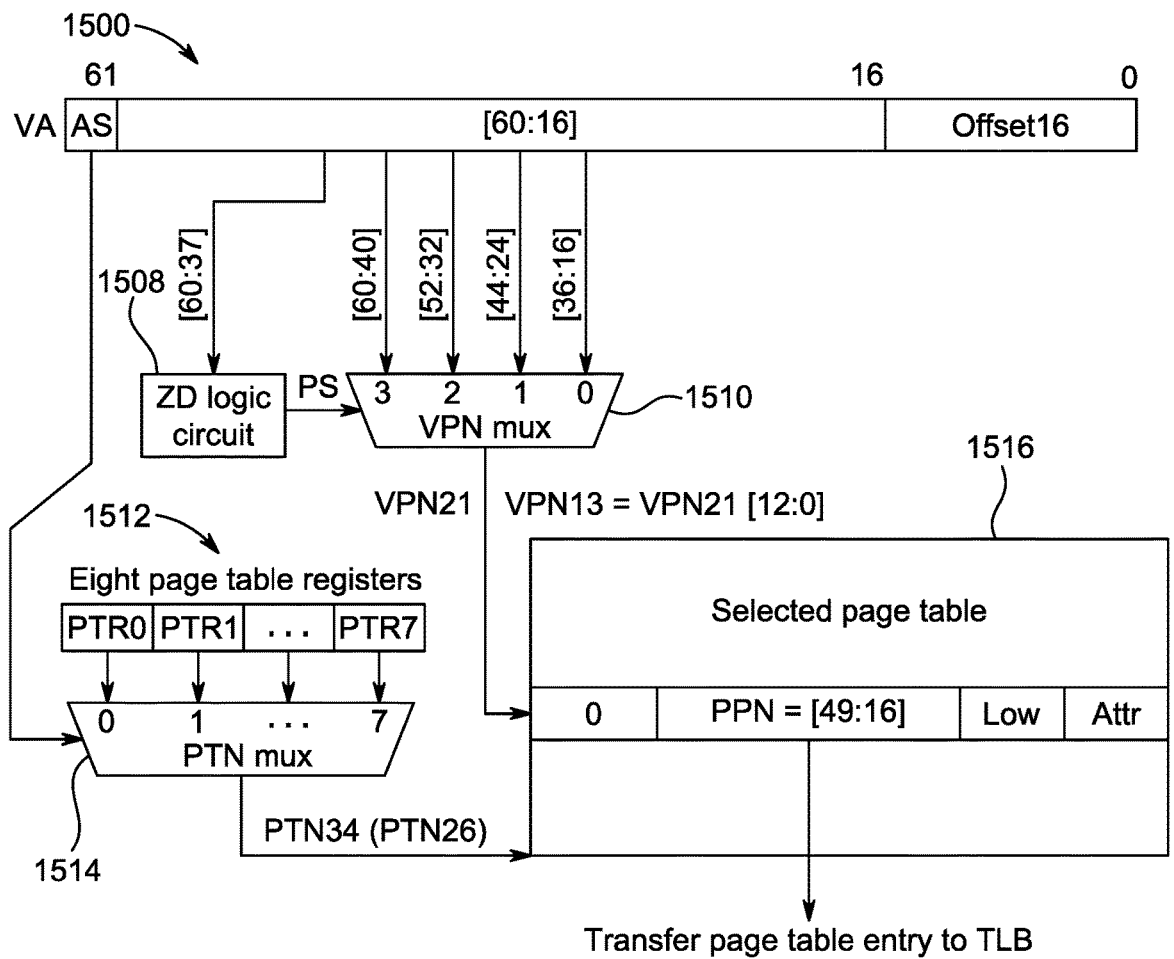
FIG. 15 shows address translation using a one-level page table, which is the simplest to implement in software and hardware, according to one or more embodiments.

A VPN multiplexer 1510 outputs a 21-bit virtual page number VPN21 according to the page size PS based on PS from zero detector (ZD) logic circuit 1508, as previously shown in FIG. 4 and FIG. 14. In the case of a TLB miss, the virtual memory system 1500 uses VPN21 as an index into a 16 MB page table as shown in FIG. 15. The virtual memory system 1500 uses the lower 13-bit VPN13 as an index into a 64 KB page table. Eight page-table registers PTR0 to PTR7 1512 store the physical addresses of different page tables for the user application, shared libraries, OS kernel, and memory-mapped IO devices. In the case of a TLB miss, the virtual memory system 1500 selects upper 3-bit AS field in the VA and select one page table register. The PTN multiplexer (mux) 1514 outputs a page table number PTN34, which is the physical address of a 64 KB page table in memory. The upper 26-bit of PTN34 is PTN26, which is the physical address of a larger 16 MB page table. The VPN multiplexer 1510 outputs VPN21/VPN13, which is used as an index into the one-level page table 1516. If the memory access is valid then the page table entry is transferred into a TLB entry and the instruction that caused the TLB miss is restarted.

Figure 16A:
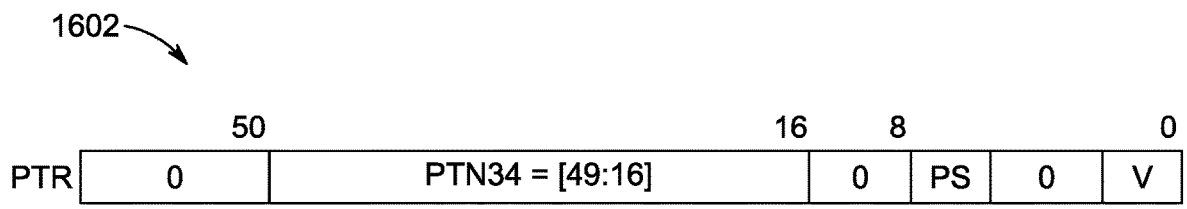
FIGS. 16A, 16B show a page table register (PTR) that stores the physical page table number of a 64 KB or 16 MB page table in memory (PTN34 or PTN26), according to one or more embodiments.
Figure 16B:
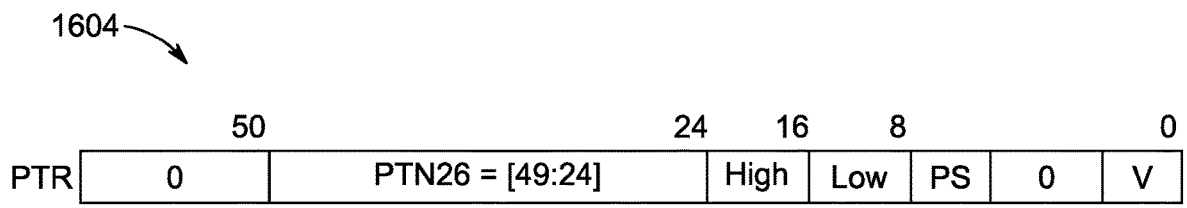

FIG. 16A and FIG. 16B show a page table register (PTR) that stores the physical page table number. In particular, FIG. 16A shows PTR 1602 for a 64 KB page table with PS=0 and PTN34=[49:16]. FIG. 16B shows PTR 1604 for a 16 MB page table with PS=1 and PTN26=[49:24]. 'V' bit in both FIG. 16A and FIG. 16B indicates that PTR contains a valid PTN. If PS is 0 then PTN34 is the physical page table number of a 64 KB page table, as shown in FIG. 16A. On the other hand, If PS is 1 then PTN26 is the physical page table number of a 16 MB page table, as shown in FIG. 16B. The page table number is either 34 bits (PTN34) for the 64 KB page table or 26 bits (PTN26) for the 16 MB page table. If (PS==1) and (High≠0 or Low #0) in FIG. 16B then the page table is a subpage of a 16 MB page and consists of N=High-Low contiguous physical 64 KB pages.

The selected page table entry address is computed as the concatenation of {PTN34, VPN13<<3} or {PTN26, VPN21<<3} according to the page table size.

```
PTN34 = PTR[AS].PTN34   // 34-bit Page Table Number
PTN26 = PTN34[33:8]     // 26-bit Page Table Number
PTS = PTR[AS].PS        // PS = Page Table Size
PTE_Addr = (PTS == 0)? {PTN34, VPN13<<3} :
  {PTN26, VPN21<<3}
```

If the page table is a subpage of a 16 MB page, then Low indexes the first 64 KB page and High points outside the last 64 KB page. The virtual memory system 1500 ensures that the page table is not indexed below or above the Low and High limits. Otherwise, the virtual memory system 1500 may raise an exception.

```
if (PTS==1) { // Page Table Size is 16MB or less
  High = PTN34[7:0]; // High Index in PTN34
  if (VPN21[20:13] < Low || (High!=0 && VPN21[20:13] >= High))
    Exception "Invalid Index" // VPN21 Index is Out-of-Range
}
```

The page table entry (PTE) that stores the physical page number and attributes is loaded from memory. If the page table entry is invalid (V=0), the virtual memory system 1500 generates a Page Fault exception, which is handled differently according to the X and W bits, as shown in FIG. 11.

```
PTE = Load(PTE_Addr)      // Load Page Table Entry
if (PTE.V == 0)           // Check PTE Validity
    Exception "Page Fault";   // Handle Page Fault
```

If the page table entry is valid (V=1) then it is transferred into a TLB entry and the instruction that caused the TLB miss is replayed.

Figure 17:
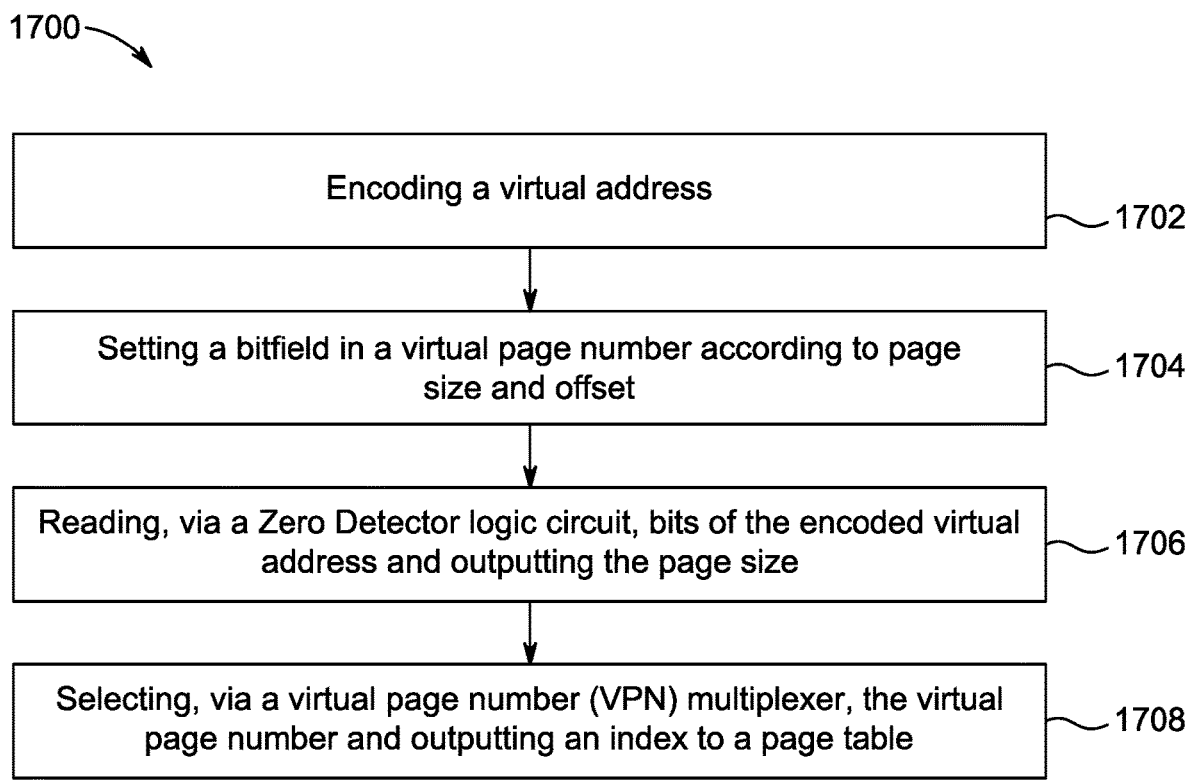
FIG. 17 is a flowchart depicting a method of managing a virtual memory page table for a central processing unit, according to certain embodiments.

FIG. 17 illustrates a flow chart of a method of managing a virtual memory page table for a central processing unit. The order in which the method 1700 is described is not intended to be construed as a limitation, and any number of the described method steps can be combined in any order to implement the method 1700. Additionally, individual steps may be removed or skipped from the method 1700 without departing from the spirit and scope of the present disclosure.

At step 1702, the method 1700 includes encoding a virtual address. In an example, the memory 404 may encode the virtual address. In an example, the encoding of the virtual address maps to multiple page sizes in a single one-level page table 420.

At step 1704, the method 1700 includes setting a bitfield in the virtual page number according to page size and offset. In an example, the virtual page number may be a 13 bit virtual page number or a 21 bit virtual page number. The virtual page number may include a settable bitfield that is set by the virtual memory system 400.

At step 1706, the method 1700 includes reading, via the zero detector logic circuit 408, bits of the encoded virtual address (for example, virtual address 402) and outputting the page size. In an example, the zero detector logic circuit 408 may examine the virtual address and output a page size. In an example, the zero detector logic circuit 408 may read bits from 37th bit to 60th bit of the encoded virtual address 402 to determine and output the page size.

At step 1708, the method 1700 includes selecting, via a virtual page number (VPN) multiplexer 410, the virtual page number (for example, VPN13 or VPN 21) and outputting an index to a page table 420. In an example, the VPN multiplexer 410 selects the virtual page number from four different positions in the virtual address. In an example, a single translation lookaside buffer (TLB) is used by multiple different page sizes a single translation lookaside buffer (TLB) is used by multiple different page sizes.

Numerous modifications and variations of the present disclosure are possible in light of the above teachings. It is, therefore, to be understood that within the scope of the appended claims, the invention may be practiced otherwise than as specifically described herein.

What is claimed is:

1. A virtual memory circuitry that encodes a virtual address (VA) in a VA memory for four different page sizes in a main memory, with a virtual page number encoded in settable bitfields of the VA,
   wherein page size PS is implicit in the VA according to which bits in the VA are zeros,
   multiple page table registers for separate address spaces; and
   the virtual memory circuitry selecting, using an address space (AS) field, a page table register among the page table registers, which stores a physical page table number and its size.

2. The virtual memory circuitry of claim 1, further comprising:
   a page table that is a subpage of a 16 MB page in the main memory, wherein the page table is a contiguous block of N×64 KB physical pages.

3. The virtual memory circuitry of claim 1, further comprising:
   a single-level page table, in the main memory, allocating entries and mapping pages of different sizes.

4. The virtual memory circuitry of claim 1, further comprising:
   a one-level page table, in the main memory, wherein TLB misses are handled with just one memory reference in the one-level page table.

* * * * *